Figure 1:
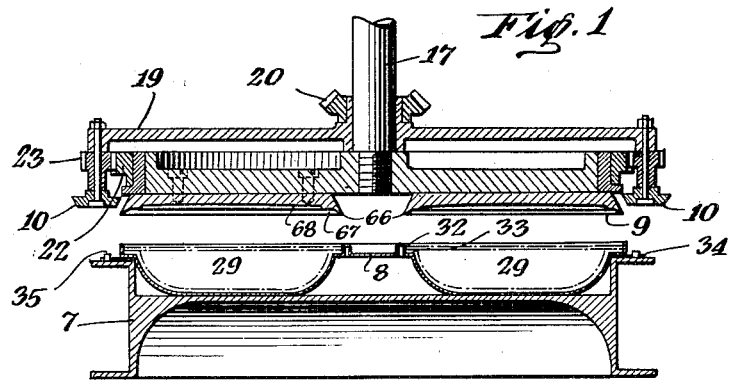

Jan. 19, 1932.  T. M. MEARS  1,841,495
PIE MAKING MACHINE AND PIE PAN THEREFOR
Filed March 17, 1931  3 Sheets-Sheet 2
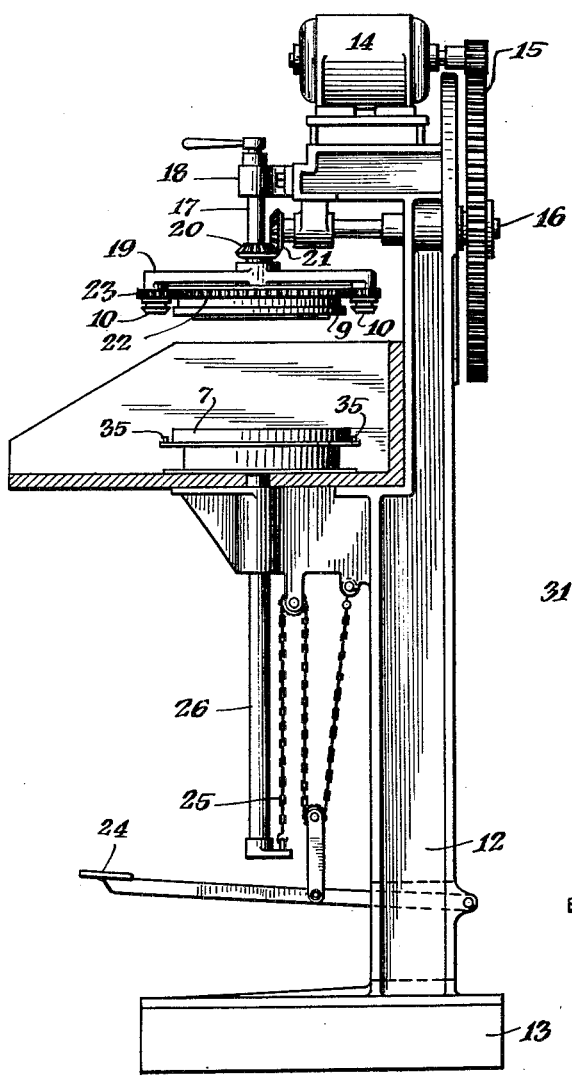
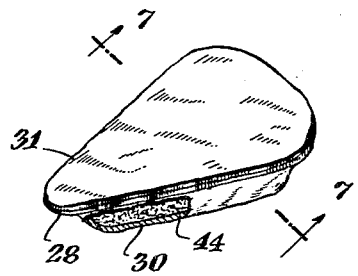
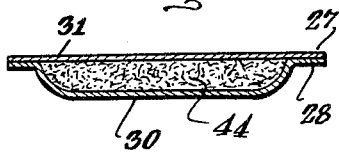
Inventor
Theodore M. Mears
By his Attorney
Charles A. Morton

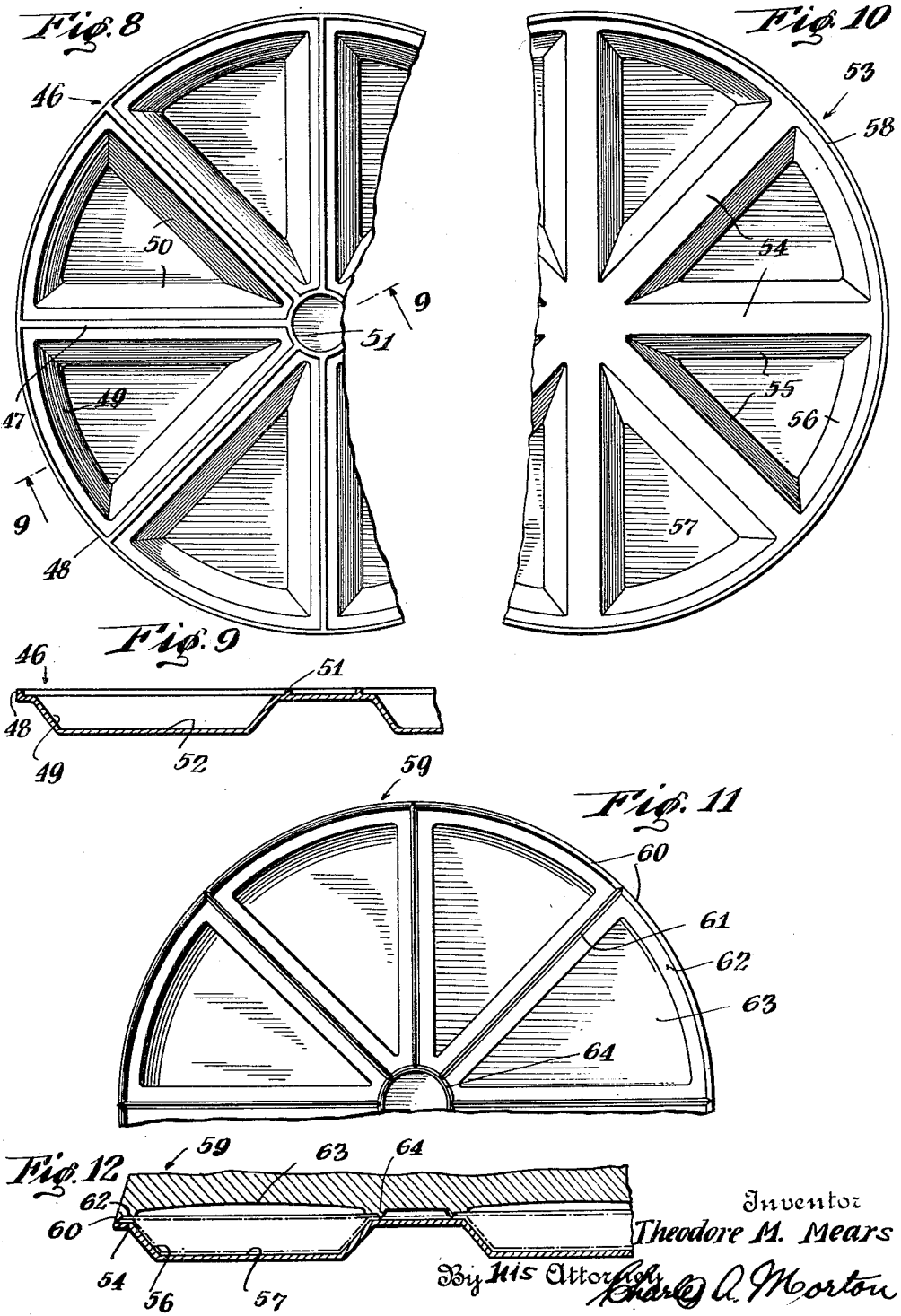

Patented Jan. 19, 1932

1,841,495

UNITED STATES PATENT OFFICE

THEODORE M. MEARS, OF BROOKLYN, NEW YORK, ASSIGNOR TO THE TRI-PIE CORPORATION, OF BROOKLYN, NEW YORK, A CORPORATION OF DELAWARE

PIE MAKING MACHINE AND PIE PAN THEREFOR

Application filed March 17, 1931. Serial No. 523,255.

This invention relates to pie making machines and dies therefor and more particularly to machines for converting one large raw pie into a plurality of individual pies by a die stamping process.

The apparatus disclosed in this application is particularly adapted for carrying out the process described in my copending application Serial No. 523,254 filed March 17th, 1931.

One object of this invention is a machine for making die stamped or die molded pies.

Another object of this invention is a die adapted to be used in such machines.

Another object of this invention is a pie plate or receptacle constituting one member of said die.

In accordance with this invention each of a series of large pie plates is fashioned in the form of a multi-unit mold constituting the lower member of a die, said member forming a readily interchangeable part of a die stamping machine, or molding press, while the upper or complementary member of said die is supported in the machine in such a manner that when a pie plate containing a large raw pie is brought into registery with said upper die member under pressure the large raw pie is subdivided into a plurality of individual pies or units of uniform size and shape each pie being completely enclosed in a jacket or shell of raw dough to which the dies by a combination molding-stamping operation have imparted the ultimate shape of the commercial pie, the waste dough if any being trimmed off and made available for re-use.

In the drawings comprising three sheets of twelve figures numbered Figures 1 to 12 inclusive, one embodiment of the invention is set forth.

Figure 2:
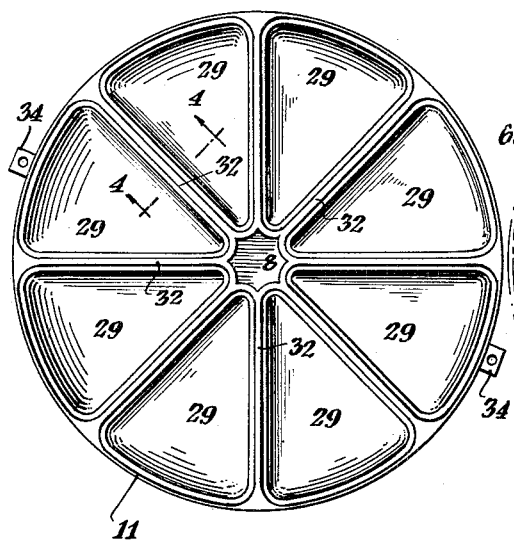
Figure 3:
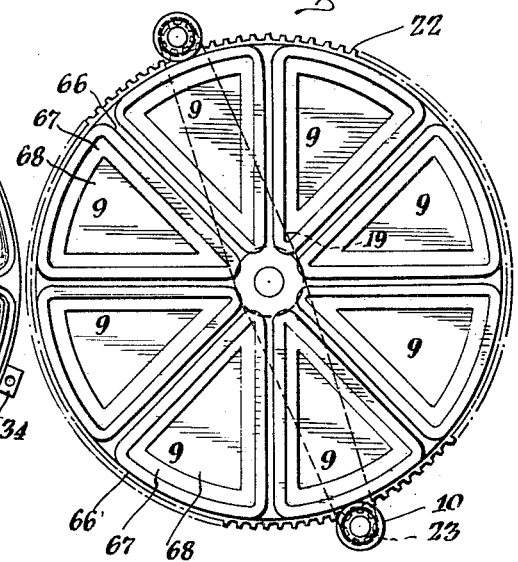
Figure 4:
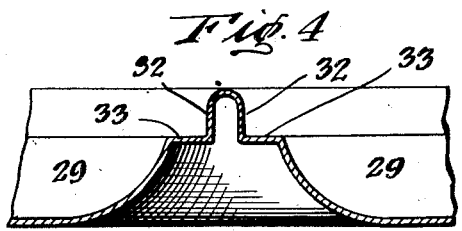

Figure 1 is a central vertical section of the dies and certain associated parts; Figure 2 is a planview of the lower die member looking from above; Figure 3 is a plan view of the working face of the upper die member looking from below; Figure 4 is a sectional view of the lower die member taken along the line 4—4 of Figure 2 looking in the direction of the arrows; Figure 5 is a side view of one form of machine for operating the dies; Figure 6 is a perspective view of the pie showing the side wall thereof partially broken away to reveal the contents thereof; Figure 7 is a vertical section taken along the line 7—7 of Figure 6, looking in the direction of the arrows; Figure 8 is a plan view of a modification of the pie pan or lower mold partially broken away; Figure 9 is a vertical section thereof taken along the line 9—9 of Figure 8, looking in the direction of the arrows; Figure 10 is a plan view of another modification of the pie pan or lower mold partially broken away; Figure 11 is a plan view of the working face of an upper die member (partially broken away) intended to be used in conjunction with the mold of Figure 10; and Figure 12 is a central vertical section (partially broken away) of the mold of Figure 10 and the die of Figure 11 when assembled to carry out the pie finishing operation.

Like reference characters designate corresponding parts throughout the several figures of the drawings.

The machine consists essentially of the pie pan or mold 8 (Figure 2) constituting the lower member of the die (Figure 1). The complementary or upper die 9 (Figure 3), is of a contour conforming to that of the pan 8. Each shallow recess 29 (Figure 2) is sector shaped in plan and the walls thereof terminate in the laterally outwardly projecting flanges 33 merging into the peripheral side walls 32. Adjacent partition walls 32 constitute a series of radially extending reinforcing ribs for the pan 8. The upper die consists of a series of sector shaped blocks 9 having their peripheral walls bevelled which constitute means for cutting the upper and lower layers of dough 31 and 30 along the inner faces of the walls 32 and for pressing the adjacent edges 27 and 28 of the dough 30 and 31 (Figure 7) together, to unite them on the flanges or seats 33. The peripheral bevelled wall of each sector shaped die member 9 forms a snug fit in the angle formed between the peripheral side walls 32 and the flanges 33 of the receptacles 29.

One form of mechanism for effectuating the purpose for which the die is to be used is shown in Figure 5. It consists of a frame 12, secured to a pedestal 13. A motor 14 carried by said frame is suitably geared to a gear wheel 15, which drives shaft 16, the latter being journalled in bearings carried by the frame 12. A second shaft 17 is supported in an extension arm 18 of frame 12. The arm 19 carrying cutters 10—10 is rotatably mounted upon shaft 17 and rotary movement is imparted to said shaft and arm by drive shaft 16, by way of bevelled gears 20 and 21 the former mounted on shaft 17 and the latter on shaft 16. The arm 19 and cutters 10—10 (Figures 1, 3 and 5), are guided by the small gears 23—23 which in turn engage the circular rack 22. When therefore the motor 14 is in operation the arm 19 and cutters 10—10 will rotate around the circumferential wall formed by the assembled sector shaped blocks 9 but in spaced relation with respect thereto. The pie pan or mold 8 constituting the interchangeable lower member of the die, may be provided with punched extensions 34—34 (Figure 2) adapted to be fitted upon the studs 35—35 of the bowl 7 (Figures 1 and 5) to place the interchangeable pan 8 containing the raw pie (Figure 1) in position to allow the upper and lower die members to be brought into correct registry when one of said die members is moved relative to the other. The bowl 7 may if preferred be given a contour conforming to that of the lower wall of the pan 8 so as to provide additional support to the pan 8 during the pie finishing operation.

Bowl 7 is supported upon a plunger 26, which is linked by way of chain 25 to the pivoted foot lever 24. Applying downward pressure upon the pivoted foot lever 24, causes plunger 26 to move vertically upwards as the pulley wheel attached to the extension of foot lever 24 under which chain 25 passes is carried downwards with foot lever 24.

The operation is as follows. A freshly made unbaked pie in its associated pan or mold 8 is placed in the bowl 7 and the foot operated lever 24 is depressed to cause the chain 25 to force plunger 26 supporting bowl 7 vertically upwards whereby the pie is compressed between the walls of the upper and lower dies and the cutters 10 press the raw dough against the edge of flange 11 of the pan or mold 8 cutting off the waste dough. At the same time the upper and lower layers of dough are compressed between the dies to unite said layers 27 and 28 (Figure 7) along their oppositely disposed contacting edges. The said upward movement of the pan or mold 8 carried by bowl 7 and plunger 26 also causes the bevelled edges of the peripheral walls of the upper die 9 to sever the upper and lower layers of dough along the lines of the radial partition walls 32 of the pan die 8 and the further upward movement of plunger 26 causes the peripheral walls of the upper die to compress the peripheral edges 27 and 28 of the upper and lower layers of dough 31 and 30 against the peripheral flanges 33 and their associated partitioning peripheral walls 32 (Figure 4). In this manner the large pie is divided into a plurality of individual pies of uniform size shape and appearance each of said pies being a modification from the pie portion of the former standard practice in that the sweetmeat is sealed within a shell of dough. The foot operated lever 24 is now released and the pan die 8 is removed from the bowl 7 and inserted in the oven and baked. After being baked the individual pies may be removed from the pan or mold 8 by merely turning the same upside down when the pies fall out of their own weight.

The edge 66 of the bevelled wall of the die 9 severs the united layers of dough 30 and 31 while the flange 33 of plate 8 (Figure 4) and the flange 67 of die 9 (Figure 1) co-operate to mold the edges of the layers of dough and impart to them the ultimate shape indicated at 28 and 27 respectively (Figure 7). The die 9 may be hollowed out or recessed as indicated at 68 as it is considered desirable to avoid subjecting the face of the upper layer of dough 31 and the sweetmeat 44 to pressure during the pie finishing operation.

Referring to the modification shown in Figures 8 and 9 the mold or pie pan 46 is preferably cast so as to include a plurality of sector shaped receptacles bounded by the radial flanges 47 and outer and inner circumferential flanges 48 and 51 which flanges taken together constitute a series of sector shaped peripheral walls for the associated receptacles. The bottom wall 52 is flat, while the side walls 50—50 and rear walls 49 of the several receptacles are bevelled as shown. The mold 46 can if desired be used as a substitute for the mold 8 shown in Figure 2.

The mold 53 shown in Figures 10 and 12 is still another modification wherein the flanges 47, 48 and 51 of the mold 46 of Figures 8 and 9 are omitted. Each sector shaped receptacle is provided with bevelled side walls 55—55, a bevelled rear wall 56, and a flat bottom wall 57. The omission of the flanges 47, 48 and 51 leaves the top of the mold 53 smooth thus facilitating the cleaning of the mold. The outer edge of the peripheral flange is smoothed off as at 58 to eliminate any sharp edge therefrom. A die 59 suitable for use with mold 53 is disclosed in Figures 11 and 12. The flanges 47, 48 and 51 of pan 46 (Figure 8) have been in effect transferred to the upper die 59 to constitute the cutters 61, 60 and 64 (Figures 11 and 12) for severing the walls of dough to sub-divide the pie into a plurality of unit pies. The flange 54 of mold 53 and flange 62 of die 59 will co-operate to press the dough and form the flanges 28 and 27 (Figure 7). The die 59 may be recessed as at 63 to avoid pressing the top of the pie and the sweetmeat 44 during the pie finishing operation.

The pies thus produced by the machine or press shown in Figure 5 are in effect die stamped or die molded, and the pans 8, 46 and 53 are in effect molds constituting an interchangeable lower die member for co-operating with the fixed upper die member 9 or 59 to impart the final shape to the pie in the operation of sub-dividing it into individual pie units.

What is claimed is:—

1. A pie finishing machine comprising a male die member having a downwardly extending wall surrounding the die, a series of partition walls, said walls subdividing the die into a plurality of sector shaped walled areas each of said areas being equal in size to the standard sector shaped individual pie portion, the bottom face of each of said walls defining a flange, a cutter secured to the lower outer edge of the wall surrounding the die throughout the length thereof, and a series of cutters equal in number and length to the number and length of the partition walls and secured along the bottom centre line of the several partition walls.

2. In a pie finishing machine and in combination a mold sub-divided into a plurality of spaced receptacles having partition walls between them the whole forming a multi-unit plate for one large pie and constituting an interchangeable female member of a die, a complementary male die slidably operable to register with the female die along the said partition walls to sub-divide the large pie therein contained without wastage into a plurality of individual sealed pies and to crimp the peripheral marginal edges of said individual pies, means for indicating when the interchangeable member is positioned to correctly register with the male member, and means for sliding one of said members into registry with the other to effect said sub-dividing and crimping operations.

3. In a pie finishing machine and in combination a male die member having a plurality of cutting members arranged to define a plurality of closed sector shaped areas each equal in size to a standard sector shaped individual pie portion, said sector shaped areas being assembled to define a regular figure, and a multi-unit pie plate for one large pie said plate forming one of a series of interchangeable complementary female dies, and being subdivided into a plurality of spaced receptacles, each receptacle being sector shaped in form and having a bottom wall, side walls constituting permanent partition walls between adjacent receptacles, and a back wall, the upper surfaces of said side and back walls constituting seats against and along which the cutting members of the male die cut the upper and lower layers of dough of the large pie vertically to separate the large pie into a plurality of individual trimmed pies equal in number to the number of spaced receptacles.

4. A pie finishing machine comprising a male die member having a downwardly extending annular wall encircling the die, a series of equally spaced partition walls extending radially inwards from said annular wall and joined together at the center, the bottom of each of said walls defining a flange, an annular cutter encircling the lower outer edge of the annular wall, and a series of cutters equal in number and length to the number and length of the partition walls and secured along the bottom centre line of the several partition walls said walls and cutters thereby defining a plurality of sector shaped walled areas the area within the cutting edges of each sector being equal in size to a standard sector shaped individual pie portion.

5. A pie baking pan sub-divided into a plurality of spaced receptacles forming a single multi-unit plate for one large pie, each receptacle being sector shaped in form, substantially equal in area to the conventional sector shaped individual pie portion, and having a bottom wall, side walls constituting permanent partition walls between adjacent receptacles, and a back wall, flanges projecting laterally outwards from the partition and back walls, said flanges merging together to constitute a smooth continuous seat against and along which the upper and lower layers of dough of the large pie may be compressed and united in the operation of cutting and separating the large pie into a plurality of individual pies the number of individual pies being determined by the number of spaced receptacles.

6. In a pie finishing machine and in combination a male die member having a plurality of cutting and compressing members arranged to define a plurality of sector shaped areas each equal in size to a standard sector shaped individual pie portion, said sector shaped areas being assembled to define a regular figure, and a multi-unit pie plate for one large pie said plate forming one of a series of interchangeable complementary female dies, and being subdivided into a plurality of spaced receptacles, each receptacle being sector shaped in form and having a bottom wall, side walls constituting permanent partition walls between adjacent receptacles, and a back wall, the upper surfaces of said side and back walls being flat to constitute smooth seats against and along which the cutting and compressing members of the male die compress the upper and lower layers of dough of the large pie in the operation of uniting said layers horizontally and cutting said layers vertically to separate the large pie into a plurality of individual pies equal in number to the number of spaced receptacles.

7. In a pie finishing machine and in combination a bowl for supporting one of a series of interchangeable pie plates, means mounted adjacent to said bowl operable to sub-divide a pie positioned on the bowl supported pie plate into a plurality of individual sector shaped pies, and to seal the pies so formed by crimping the layers of dough along the marginal edges of the pie, and means for bringing said pie plate so carried by said supporting bowl and said sub-dividing and crimping means into operative relation to effect said sub-dividing and crimping operations.

8. In a pie finishing machine and in combination a bowl for supporting one of a series of interchangeable pie plates, means mounted adjacent to said bowl operable to trim and sub-divide a pie positioned on the bowl supported pie plate into a plurality of individual sector shaped pies and to crimp the pies so formed along their peripheral marginal edges, and means for bringing said pie plate so carried by said supporting bowl and said trimming, sub-dividing and crimping means into operative relation to effect the sub-division of the pie.

9. In a pie finishing machine and in combination a holder for supporting one of a series of interchangeable pie plates said plate being sub-divided into a plurality of sector shaped spaced receptacles, a die-cutter operable in registry with said holder supported pie plate to sub-divide a pie formed on said plate into a plurality of individual sector shaped pies and to crimp said pies along their peripheral marginal edges, and means operable to bring said cutter and said holder supported pie plate into co-operative registry to effect said pie dividing and said crimping operations.

10. In a pie finishing machine and in combination a male die member having a plurality of compressing members arranged to define a plurality of sector-shaped areas each equal in size to a standard sector-shaped individual pie portion, said sector-shaped areas being assembled to define a regular figure, and a multi-unit plate for one large pie said plate forming one of a series of interchangeable complementary female dies, and being subdivided into a plurality of spaced receptacles, each receptacle being sector-shaped in form and having a bottom wall, side walls constituting permanent partition walls between adjacent receptacles, and a back wall, the upper surfaces of said side and back walls constituting seats against and along which the compressing members of the male die compress the upper and lower layers of dough of the large pie preparatory to the separation thereof into a plurality of individual pies equal in number to the number of spaced receptacles.

11. In a pie finishing machine and in combination a multi-unit pie plate for one large pie, said plate being subdivided into a plurality of spaced receptacles, each receptacle being sector shaped in form and having a bottom wall, side walls constituting partition walls between adjacent receptacles, and a back wall, and having flanges between said side walls and extending from said back walls, means for separating the upper and lower layers of dough vertically along the flanges between side walls to sub-divide the pie into a plurality of individual pies, means for compressing the upper and lower layers of dough along all of said flanges in a direction angularly disposed to the line of separation, and means co-acting with the compressing means to trim the waste dough.

12. In a pie finishing machine and in combination a multi-unit pie plate for one large pie, said plate being sub-divided into a plurality of spaced receptacles, each receptacle being sector shaped in form and having a bottom wall, side walls constituting partition walls between adjacent receptacles, and a back wall, and having flanges between said side walls and extending from said back walls, means for separating the upper and lower layers of dough vertically along the flanges between side walls to sub-divide the pie into a plurality of individual pies, means for compressing the upper and lower layers of dough along all of said flanges in a direction angularly disposed to the line of separation, and means for engaging the plate to assure correct registry of the separating and compressing means with the plate flanges.

Signed at Brooklyn in the county of Kings and State of New York this 14th day of March A. D. 1931.

THEODORE M. MEARS.